United States Patent
Filsinger et al.

(10) Patent No.: US 11,009,081 B2
(45) Date of Patent: May 18, 2021

(54) WET DUAL PLATE CLUTCH WITH LEVERS IN THE WET CHAMBER

(71) Applicant: SCHAEFFLER TECHNOLOGIES AG & Co. KG, Herzogenaurach (DE)

(72) Inventors: Andreas Filsinger, Neckargemünd (DE); Patrick Weydmann, Bühl (DE); Gerhard Gander, Bühlertal (DE); Alexamder Obitz, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 645 days.

(21) Appl. No.: 15/322,163

(22) PCT Filed: Jun. 9, 2015

(86) PCT No.: PCT/DE2015/200352
§ 371 (c)(1),
(2) Date: Dec. 26, 2016

(87) PCT Pub. No.: WO2015/197062
PCT Pub. Date: Dec. 30, 2015

(65) Prior Publication Data
US 2017/0138410 A1    May 18, 2017

(30) Foreign Application Priority Data
Jun. 27, 2014   (DE) .................... 10 2014 212 416.6

(51) Int. Cl.
*F16D 21/00*   (2006.01)
*F16D 21/06*   (2006.01)
(Continued)

(52) U.S. Cl.
CPC ............ *F16D 13/385* (2013.01); *B60K 17/02* (2013.01); *B60K 17/28* (2013.01); *F16D 13/52* (2013.01);
(Continued)

(58) Field of Classification Search
None
See application file for complete search history.

(56) References Cited

U.S. PATENT DOCUMENTS 2,775,330 A * 12/1956 Schjolin ................ F16D 48/062
192/48.612
3,366,210 A    1/1968  Webster
(Continued)

FOREIGN PATENT DOCUMENTS

DE    102012207244 A1   11/2012
DE    102013214966 A1   2/2014
(Continued)

*Primary Examiner* — Charles A Fox
*Assistant Examiner* — Ryan P Dodd
(74) *Attorney, Agent, or Firm* — Kevin Parks

(57) ABSTRACT

A multi-plate dual clutch for coupling a motor vehicle engine to a drive shaft of a motor vehicle transmission and to an auxiliary power take-off output shaft of the motor vehicle. The dual clutch includes a drive clutch for coupling the motor vehicle engine with the drive shaft, and an auxiliary power take-off clutch for coupling the motor vehicle engine with the auxiliary output shaft. The drive clutch and the auxiliary power take-off clutch can each to be operated independently of one another by a separate lever mechanism. The dual clutch includes a wet chamber housing in which the drive clutch, the auxiliary power take-off clutch, and the respective lever mechanisms are accommodated in fluid-tight relationship.

13 Claims, 6 Drawing Sheets

(51) Int. Cl.
*F16D 13/38* (2006.01)
*B60K 17/02* (2006.01)
*B60K 17/28* (2006.01)
*F16D 13/52* (2006.01)
*F16D 23/12* (2006.01)
*F16D 13/74* (2006.01)

(52) U.S. Cl.
CPC ............. *F16D 21/06* (2013.01); *F16D 23/12* (2013.01); *F16D 13/74* (2013.01); *F16D 2021/0676* (2013.01); *F16D 2023/126* (2013.01); *F16D 2300/0214* (2013.01); *F16D 2300/12* (2013.01)

(56) References Cited

U.S. PATENT DOCUMENTS

| | | | | |
|---|---|---|---|---|
| 3,884,335 A | * | 5/1975 | Ashfield | B60K 17/02 192/113.34 |
| 4,116,322 A | * | 9/1978 | Ashfield | B60K 17/02 192/48.8 |
| 2005/0279604 A1 | * | 12/2005 | Vetter | F16D 21/06 192/48.8 |
| 2007/0193843 A1 | * | 8/2007 | Uhler | F16D 13/52 192/48.8 |
| 2007/0240961 A1 | * | 10/2007 | Gremplini | F16D 25/082 192/48.606 |
| 2009/0205924 A1 | * | 8/2009 | Agner | F16D 13/72 192/48.601 |
| 2011/0290610 A1 | * | 12/2011 | Arnold | F16D 3/66 192/48.1 |
| 2013/0153356 A1 | * | 6/2013 | Fleischmann | F16D 21/06 192/48.9 |

FOREIGN PATENT DOCUMENTS

| | | |
|---|---|---|
| DE | 102013215079 A1 | 2/2014 |
| WO | 2006084435 A1 | 8/2006 |

* cited by examiner

WET DUAL PLATE CLUTCH WITH LEVERS IN THE WET CHAMBER

CROSS-REFERENCE TO RELATED APPLICATIONS

This application is the U.S. national phase patent application under 35 U.S.C. § 371 of International Patent Application Serial No. PCT/DE2015/200352, having an international filing date of 9 Jun. 2015, and designating the United States, which claims priority based upon German Patent Application No. DE 10 2014 212 416.6, filed on 27 Jun. 2014, the entire contents of each of which applications are hereby incorporated by reference herein to the same extent as if fully rewritten.

BACKGROUND OF THE INVENTION

Field of the Invention

The present invention relates to a dual clutch, in particular a multi-plate dual clutch for coupling a drive shaft of a motor vehicle engine to a transmission shaft of a motor vehicle transmission and/or an auxiliary output shaft of an auxiliary power take-off of the motor vehicle, in particular a power take-off shaft. The dual clutch includes a drive clutch for coupling the motor vehicle engine with the transmission shaft and an auxiliary power take-off clutch for coupling the motor vehicle engine with the auxiliary output shaft. The drive clutch and the auxiliary power take-off clutch are each to be operated independently of one another by means of a separate lever mechanism, preferably designed/prepared for pressure-transmitting or tension-transmitting actuation/axial displacement, which can be acted upon, for example, by a CSC or a similar actuator.

Description of the Related Art

Dry dual clutches that are installed outside of the transmission on the vehicle and are actuated mechanically are known from the prior art. Such conventional dual clutches have a first clutch for driving operation, the so-called drive clutch or drive shaft clutch, and a second clutch for an auxiliary drive, for example a power take-off drive, the so-called auxiliary drive clutch or power take-off drive clutch. A distinction is made between conventional dual clutches, in which the drive shaft clutch and the power take-off shaft clutch are engaged in the deactivated state, and safety clutches (so-called safety PTO dual clutches), in which the drive shaft clutch is engaged in the deactivated state and the power take-off shaft clutch is disengaged in the deactivated state.

It is disadvantageous that in such known dry dual clutches the maximum thermal absorptive capacity of the clutches and the maximum thermal capacity of the clutch linings as a rule is quickly reachable, in particular when transmitting high torques. Increasing the transmissible torque while keeping the construction size the same is therefore limited. In the critical load range, high wear of the friction linings and a resulting change of the operating points and clamping forces is therefore the negative consequence.

Added to the problem situation described above is the fact that the average power of motor vehicles using dual clutches, for example tractors, and thus the demands on the clutches, are constantly growing. Present-day tractor dual clutches have reached their performance limits in some cases, especially with regard to thermal demands.

In WO 2006/084435 A1 a clutch unit is disclosed having a housing that is attachable to a flywheel. To make a first and a second clutch in that clutch unit two contact plates are contained which are non-rotating relative to the housing but are axially movable, and to each of which a clutch disk is assigned. The clutches are actuatable independently of one another by means of lever arrangements that are swivel-mounted on the housing, wherein one lever arrangement is coupled with each contact plate to disengage and engage the corresponding clutch. The first clutch facing the flywheel is engaged in the non-actuated state by means of a diaphragm spring clamped between its contact plate and the housing, the diaphragm spring being positioned axially between the adjacent contact plates. The second clutch, provided on the side of the first clutch facing away from the flywheel, is disengaged in the non-actuated stage and is forced closed by a force exerted on its lever arrangement, the lever arrangement of the second clutch being coupled with the assigned contact plate by means of axially operative tensile elements. There is at least one spring element clamped between the tensile elements and the contact plate, which has a predetermined pre-tensioning when the second friction clutch is disengaged and undergoes an additional elastic deformation as the second clutch is engaged.

In DE 10 2012 207 244 A1 a clutch arrangement is disclosed for use in the drive train of a tractor, including a drive clutch and an auxiliary drive clutch, wherein the drive clutch is positioned between an internal combustion engine and a transmission input shaft, and the auxiliary drive clutch is positioned between the internal combustion engine and an auxiliary drive, wherein the clutch arrangement includes a clutch housing having a formed sheet metal part.

In DE 10 2013 214 966 A1 a dual clutch is disclosed for coupling a drive shaft of a motor vehicle engine with a transmission shaft of a motor vehicle transmission, and/or an auxiliary power take-off of the motor vehicle, in particular a power take-off shaft. The dual clutch includes a first friction clutch for frictionally pressing a first clutch disk that is couplable with the transmission shaft between a first contact plate and a first counter plate, wherein the first contact plate is movable in an axial direction to engage the first friction clutch. A second friction clutch is included for frictionally pressing a second clutch disk that is couplable with the auxiliary power take-off between a second contact plate and a second counter plate, wherein the second contact plate is movable in the axial direction to engage the second friction clutch. A first actuating element is provided to move the first contact plate and a second actuating element is provided to move the second contact plate, wherein the second contact plate is connected to a thrust ring that is operationally connected to the second actuating element to transmit the displacing movement. A pre-stressed pressure storage element is positioned between the second actuating element and the thrust ring.

In DE 10 2013 215 079 A1 a dual clutch is disclosed for coupling a drive shaft of a motor vehicle engine with a transmission shaft of a motor vehicle transmission and/or to an auxiliary power take-off of the motor vehicle, in particular a power take-off shaft. The dual clutch includes a first friction clutch for frictionally pressing a first clutch disk that is couplable with the transmission shaft between a first contact plate and a first counter plate, wherein the first contact plate is movable in an axial direction to engage the first friction clutch. A second friction clutch is provided for frictionally pressing a second clutch disk that is couplable with the auxiliary power take-off between a second contact plate and a second counter plate, wherein the second contact plate is movable in the axial direction to engage the second friction clutch. The dual clutch includes a first actuating element to move the first contact plate and a second actuating element to move the second contact plate. The second contact plate is connected to a thrust ring that is operationally connected to the second actuating element to transmit the displacing movement. The second actuating element has at least one spring element for pre-biasing, wherein the at least one spring element is positioned between the second actuating element and the thrust ring.

Starting from the above-identified prior art, an object of the present invention is to develop a dual clutch that can absorb and remove more frictional heat with the same or only slightly greater construction space, and, in addition, offers easy increase of the maximum torque. The dual clutch in accordance with the present invention should be capable of replacing known dual clutches with minimal modification effort and expense for the customer (a plug-in solution).

SUMMARY OF THE INVENTION

The object noted above is achieved by the present invention with a clutch according to the genre, the dual clutch having a wet chamber housing in which the drive clutch, the auxiliary power take-off clutch, and the respective lever mechanisms are accommodated fluid-tight. The dual clutch according to the present invention is preferably designed as a multi-plate clutch. A wet chamber housing is understood to mean a housing that is capable, inherently or through the use of seals, of creating a space that contains lubricant and is sealed/delimited against the outside.

A particular advantage of the present invention is that a conventional, existing dual clutch, for example a dry dual clutch, can be exchanged for a wet dual clutch according to the present invention with only a little modification effort and expense for the customer. The dual clutch according to the present invention is actuated by means of a lever mechanism integrated into the wet chamber housing. The clutch friction devices of both a drive clutch and an auxiliary power take-off clutch are located in a sealed area known as the wet chamber, which is enclosed by the wet chamber housing and is sealed fluid-tight. The dual clutch can therefore be designed and used advantageously as a wet clutch, so that with the same or only slightly greater construction space compared to known dual clutches according to the genre, a large volume of frictional heat can be absorbed and removed. In addition, the dual clutch according to the present invention is especially well suited for transmitting high maximum torques.

The drive clutch and the auxiliary power take-off clutch are actuatable independently of one another; in particular they are engageable simultaneously. The dual clutch according to the present invention is thus especially well suited for use in agricultural machinery such as tractors.

Advantageous embodiments of the invention will be explained in greater detail below.

According to one embodiment of the present invention, the dual clutch can have a clutch housing that supports the lever mechanisms. A drive clutch friction lining that is coupled with the drive shaft can be positioned compressably between a first clamping plate and the clutch housing. An auxiliary output friction lining that is coupled with the auxiliary output shaft can be positioned compressably between a second clamping plate and the clutch housing. The first contact plate and the second contact plate can each be indirectly or directly operationally connected and movable, in particular movable independently of one another, to engage the drive clutch and the auxiliary power take-off clutch by means of the applicable lever mechanism. The friction linings can be designed in particular as disk packs.

The wet chamber housing can have a first housing part and a second housing part. The housing parts can be joined with one another fluid-tight, in particular welded to one another, for example by means of a laser-welded seam. The housing parts of the wet chamber housing are preferably joined with one another fluid-tight with a housing seal inserted between them. It is especially advantageous if the first housing part and the second housing part are formed sheet metal parts, in particular deep drawn parts.

It is of particular advantage if the wet chamber housing has a flange for fixing on the motor vehicle structure, preferably on a transmission housing, in particular for fixing it in a non-rotatable condition. That enables the clutch to be positioned especially easily on the vehicle, and is well suited for exchanging an already existing clutch.

In another embodiment of the present invention, the wet chamber housing can form a bearing seat, in that a roller bearing is positioned that supports the clutch housing so that it can rotate relative to the wet chamber housing. Such an arrangement is easy to assemble. The roller bearing is preferably a sealed bearing, so that no additional measures are necessary to seal the wet chamber at that location.

The wet chamber housing preferably has a coolant inlet, in particular a cooling oil inlet, and additionally, or alternatively, a coolant outlet (cooling oil outlet) on its underside. In that way, the interior space or wet chamber surrounded by the wet chamber housing, in which the drive clutch and the auxiliary power take-off clutch with the respective corresponding actuating mechanisms are accommodated, can be flushed with coolant especially simply. Through the connections, for example, cooling oil from an oil reservoir, or transmission oil from the transmission, can be introduced into the wet chamber and returned from it back into the oil sump of the transmission through the outlet. For the most effective possible return of oil from the wet chamber housing, it is beneficial if a coolant channel is provided to collect the coolant. Instead of a coolant inlet in the wet chamber housing, coolant can be introduced into the wet chamber housing via the drive shaft, and/or the auxiliary output shaft, and/or a gap between them.

In another embodiment of the present invention, the wet chamber housing has a feed-through to the holder of a setting element, in particular an adjusting pin, which is positioned during operation of the clutch by means of a disengaging system. The setting element is operatively connected to the lever mechanism with a bearing unit, in particular a roller bearing unit, positioned intermediately in the wet chamber housing. It is sealed, in particular in the feed-through, through the wet chamber housing, for example by means of an O-sealing ring or similar sealing means.

An especially effective and reasonably-priced sealing of the wet chamber enclosed by the wet chamber housing is achieved by sealing the wet chamber housing in relation to the drive shaft and/or the auxiliary output shaft by means of an oil seal.

In another embodiment of the present invention, the drive clutch can have a disk carrier that is non-rotatably connected to the drive shaft, and the auxiliary power take-off clutch can have a disk carrier that is non-rotatably connected to the auxiliary output shaft.

The drive clutch can have a disk carrier. The latter is non-rotatably positioned on the drive shaft, for example by means of a toothed connection. The auxiliary power take-off clutch can likewise have a disk carrier. The latter is non-rotatably positioned on the auxiliary output shaft, for example by means of a toothed connection. The disk carrier or carriers can be a formed sheet metal part, for example a deep drawn part, and can carry the friction lining, for example on an outer edge segment.

The clutch housing of the dual clutch can be formed essentially of a clutch base plate, also referred to as the clutch housing, and a base plate carrier, which are designed as an essentially bell-shaped, formed sheet metal part, for example as a deep drawn part. The clutch base plate and base plate carrier can be welded together. A plurality of lever holders, also referred to as lever bearing blocks, can be positioned on the clutch base plate, for example by means of rivets. Each lever holder serves as a pivot support for an actuating lever for one of the clutches.

The clutch housing, for example in particular the base plate carrier, can be connected to an arc-shaped spring damper unit by means of a toothed connection, and can be coupled with it rotationally. The latter can be connected to a flywheel, which in turn can be connected to the drive unit. It is particularly advantageous if the clutch housing, in particular the base plate carrier, is supported in the axial direction by means of a journal bearing unit or similar bearing unit, in particular on the flywheel. In that way, relative movements between the flywheel and the clutch housing or base plate carrier can be absorbed. One of the shafts, the auxiliary output shaft or the drive shaft, can be supported on the flywheel by means of a roller bearing.

The friction lining of the auxiliary power take-off clutch can be positioned between the clutch housing, in particular the clutch base plate, and the disk carrier. Its disks are arranged in the axial direction and can be pressed together in the axial direction by means of the contact plate between the latter and the clutch housing, in particular the base plate carrier. The friction lining of the drive clutch can be located radially inside the plate carrier between the latter and a drive clutch housing. Its disks are arranged in the axial direction and can be pressed together in the axial direction by means of the contact plate between the latter and the drive clutch housing.

The lever mechanism for the auxiliary power take-off clutch can include an actuating lever that is pivotable about a pivot axis and is pre-biased by means of a spring. It can carry a peg on which an actuating means, for example an eye bolt, is positioned so that it can pivot. The actuating means is operationally connected to the contact plate in the axial direction. The contact plate and actuating means are preferably fixed in positions that are adjustable relative to one another. The actuating lever can be in contact with an adjuster ring. The latter is preferably supported relative to a locating pin by means of a roller bearing system, so that relative rotation between adjuster ring and locating pin is possible and position changes of the locating pin in the axial direction are transmitted to the adjuster ring.

Alternatively, the actuating lever can be provided with a threaded through hole running in the axial direction, into which an adjusting screw is screwed. The latter can reach through the actuating lever in the axial direction and be in contact with a drive clutch housing. The clutch can be adjusted by means of repositioning the adjusting screw relative to the actuating lever. The drive clutch housing can function as a contact plate, and in particular can have a collar that is located on the side of the disk pack facing away from the actuating lever in the axial direction, and that presses the disk pack in the axial direction against the clutch housing or the clutch base plate when actuated by the actuating lever.

Between the drive clutch housing and the contact plate (a part of the contact plate or a clutch base plate) of the auxiliary power take-off clutch, a power storage unit, for example a diaphragm spring, is advantageously positioned. It can also be said that the contact plate and the drive clutch housing are under tension with one another in the axial direction by means of the diaphragm spring.

Expressed differently and in summary, the dual clutch according to the present invention, which can, for example, be a tractor dual clutch, that has two clutches—one for the propulsion drive and one for the auxiliary power take-off (power take-off shaft). Each of the two clutches is actuated by means of a disengaging system present on the vehicle. This system sets the lever mechanism of the relevant clutch in motion, which results in disengaging or engaging the friction device. In particular, the clutches can be actuated simultaneously and engaged simultaneously. An increase in the torque can be enabled by adding additional frictional and steel disks. The construction space remains nearly the same when this is carried out. Parts of the dual clutch are located in a sealed waste housing that is non-rotatably connected to a transmission bell housing of the motor vehicle. Attached thereto is a connection that serves as an outlet and is located on the bottom of the waste housing to carry oil back to the oil sump of the transmission. The input of the cooling oil can occur through a separate connection in the waste housing, or through a transmission input shaft in the form of a hollow shaft, or through a gap between a solid shaft and a hollow shaft as transmission input shafts. The drive clutch and power take-off shaft clutch can be damped by using an arc-shaped spring damper. The friction system can be subjected beneficially to an oil volume flow whose task is to remove frictional heat that has developed in the clutch. Increased service life of the friction system also results.

The wet dual clutch according to the present invention, which can be realized in particular as a tractor dual clutch, offers several advantages in comparison to known dry systems. Heat can be removed effectively through oil cooling, which guarantees operation with a long service life, even under heavy loads. Because of low friction on the friction surfaces, there is little wear on the friction linings. It is easy to adapt to increases in torque with very little effect on construction space by the number of friction linings. A disengaging system previously used or installed on the motor vehicle can be taken over unchanged to actuate the clutch. All-in-all, only slight changes need to be made to the vehicle.

Multiple embodiments of the invention will be explained in greater detail below on the basis of drawings.

DESCRIPTION OF THE PREFERRED EMBODIMENTS

Figure 1:
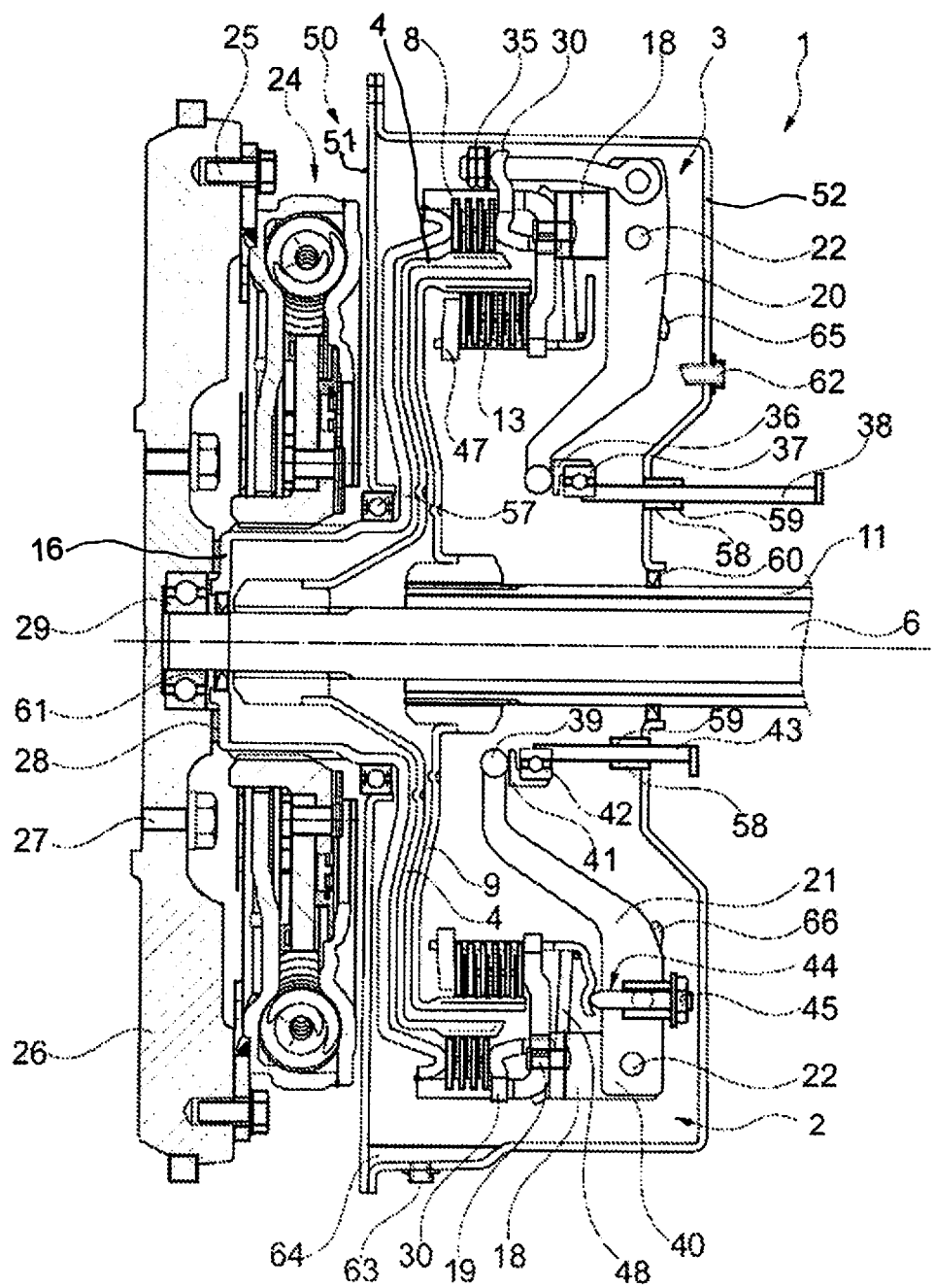
FIG. 1 is a schematic sectional view of a dual clutch according to the present invention and having a drive shaft clutch and a power take-off shaft clutch.

The figures are merely schematic in nature, and serve only to aid in understanding the present invention. The same elements are identified by the same reference numerals. Details of the different embodiments can be combined with one another.

FIG. 1 shows a dual clutch 1 according to the present invention. It includes a first, radially inner clutch unit 2, in the present exemplary embodiment a drive shaft clutch 2, and a second, radially outer clutch unit 3, in the present exemplary embodiment a power take-off shaft clutch 3. The dual clutch 1 is designed as a wet clutch.

Figure 2:
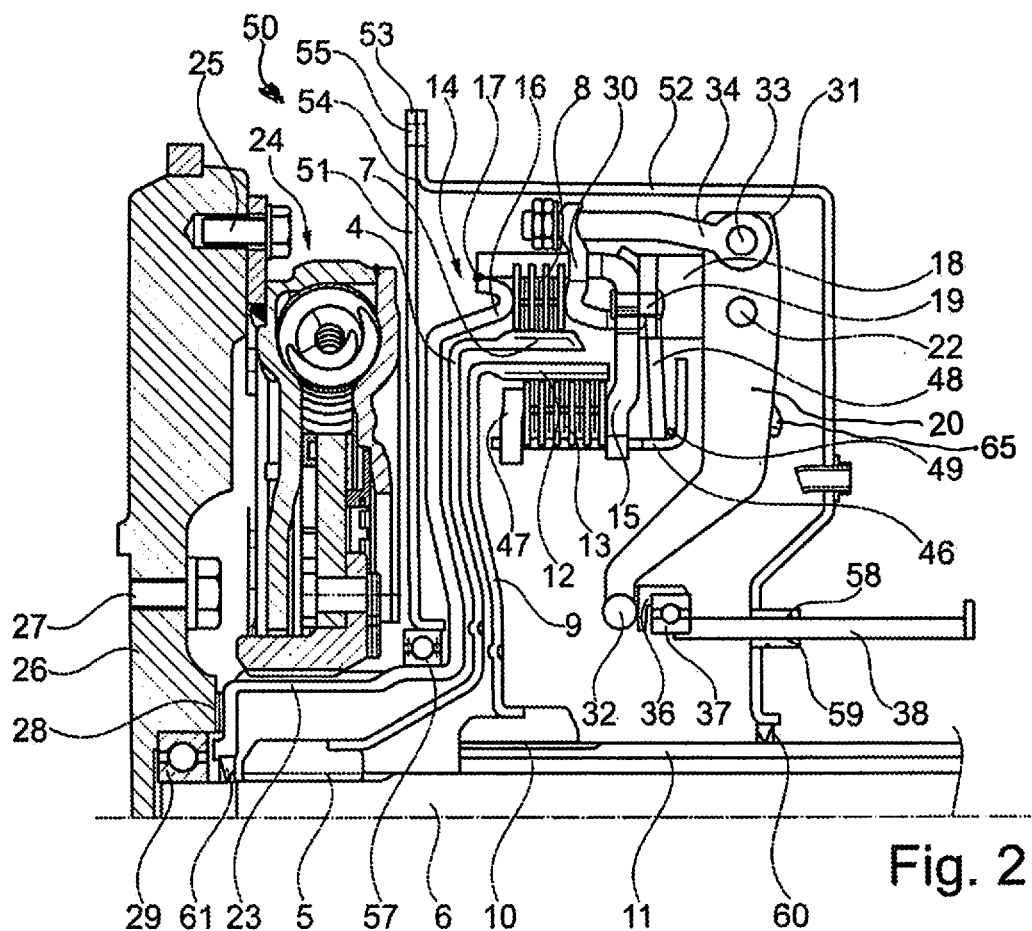
FIG. 2 is an enlarged detail of the power take-off clutch of FIG. 1.

Referring to FIG. 2, power take-off shaft clutch 3 has a disk carrier 4, that is non-rotatably positioned on a power take-off shaft 6 by means of power take-off shaft toothed connection 5. The disk carrier 4 is an essentially bell-shaped formed sheet metal part, for example a deep drawn part, and carries a disk pack 8 on the outer side of its radially outer edge segment 7.

The drive shaft clutch 2 has a disk carrier 9, that is non-rotatably positioned on a drive shaft 11 by means of drive shaft toothed connection 10. The disk carrier 9 is an essentially bell-shaped formed sheet metal part, for example a deep drawn part, and carries a disk pack 13 on the inner side of its radially outer edge segment 12.

Furthermore, the dual clutch 1 has a clutch housing 14. The latter is formed essentially of a clutch base plate 15, also referred to as the power take-off clutch housing 14, and a base plate carrier 16, that are each designed as an essentially bell-shaped formed sheet metal part, for example as a deep drawn part. The clutch base plate 15 and the base plate carrier 16 are welded together by means of a welded seam 17 running in the circumferential direction. Positioned on the clutch base plate 15 are a plurality of lever holders 18, also referred to as lever bearing blocks 18, by means of rivets 19. Each lever holder 18 serves as a pivot support for an actuating lever 20 for the power take-off shaft clutch 3 or for an actuating lever 21 (see FIG. 1) for the drive shaft clutch 2, in each case about a respective pivot axis 22 located in a respective lever holder 18.

The base plate carrier 16 is connected to an arc-shaped spring damper unit 24 through a toothed connection 23, and is thereby coupled rotationally with the bow spring damper unit 24. The latter has a flange by means of threaded connections 25 is connected to a flywheel 26, which in turn is connected by means of threaded connections 27 to a drive (not shown), for example an internal combustion engine.

Figure 9:
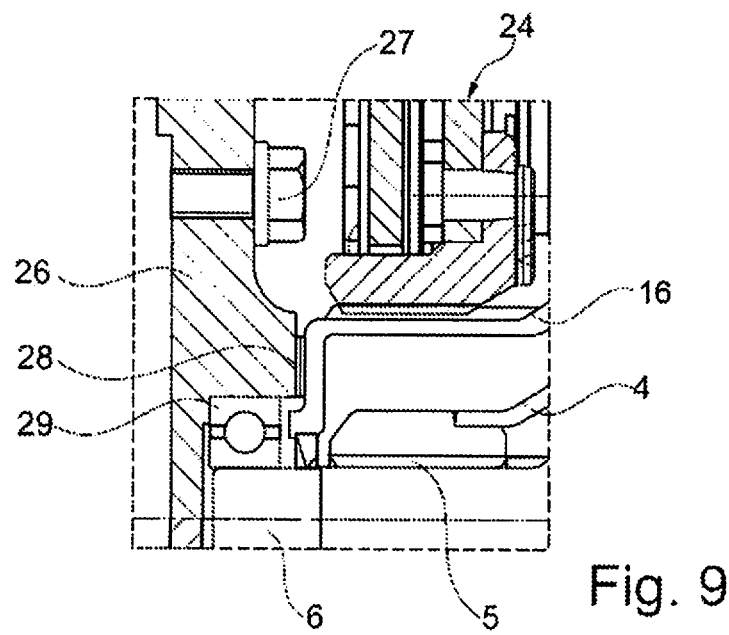
FIG. 9 shows an enlarged detail of the axial support of the dual clutch of FIG. 1.

As shown in particular in FIG. 9, the base plate carrier 16 is supported on the flywheel 26 in the axial direction by means of a journal bearing unit 28. The journal bearing unit 28 serves to enable relative movements between the flywheel 26 and the base plate carrier 16, which is non-rotatable positioned in contact with the arc-shaped spring damper unit 24. Furthermore, the power take-off shaft 6 is supported in the flywheel 26 by means of a roller bearing 29. The result is that the base plate carrier 16 rotates at the drive speed $N_{an}$, and with it also the clutch base plate 15, as shown in FIG. 1, aside from rotation speed fluctuations due to a damping effect brought about by means of the arc-shaped spring damper unit 24.

As best seen in FIG. 2, the disk pack 8 of the power take-off shaft clutch 3 is positioned between the clutch base plate 15 and the disk carrier 4. Its disks are arranged in the axial direction, and can be pressed together in the axial direction by means of a contact plate 30 between the latter and the base plate carrier 16, so that torque is transmitted from the flywheel 26 through the arc-shaped spring damper unit 24, the toothed connection 23, the base plate carrier 16, the clutch base plate 15, the disk pack 8, the disk carrier 4 and the power take-off shaft toothed connection 5 to the power take-off shaft 6.

The disk pack 13 of the drive shaft clutch 2 is located radially inside the disk carrier 9 between the latter and a drive clutch housing 46. Its disks are arranged in the axial direction, and can be pressed together in the axial direction by means of the drive clutch housing 46 between the latter and the clutch base plate 15, so that torque is transmitted from the flywheel 26 through the arc-shaped spring damper unit 24, the toothed connection 23, the base plate carrier 16, the clutch base plate 15, the disk pack 13, the disk carrier 9, and the drive shaft toothed connection 10 to the drive shaft 11.

The actuating lever 20 for the power take-off shaft clutch 3 has an outer lever end 31 formed radially outside the pivot axis 22, and an inner lever end 32 formed radially inside the pivot axis 22, and is pre-biased by means of a torsion spring 65. The outer lever end 31 has a peg 33 on which an eye bolt 34 is carried by means of its eye so that it can pivot around the peg 33. The end of the eye bolt 34 opposite the eye is provided with threads and extends through an opening provided in the contact plate 30 in the axial direction. The contact plate 30 and eye bolt 34 are fixed relative to one another in the axial direction by means of a threaded connection with lock nut 35 (see FIG. 5). The radially inner lever end 32 is in contact with an adjuster ring 36. The latter is rotatably supported relative to a metal locating pin 38 by means of a roller bearing system 37, so that relative rotation between adjuster ring 36 and locating pin 38 is possible and position changes of the locating pin 38 in the axial direction are transmitted to the adjuster ring 36.

Figure 4:
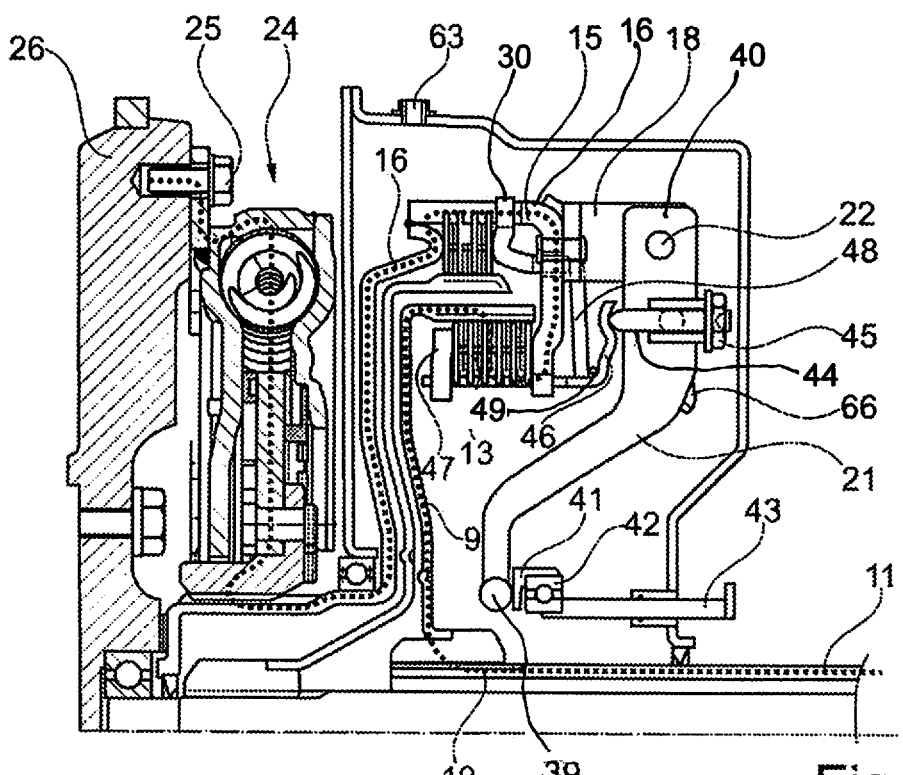
FIG. 4 shows the flow of torque in the drive shaft clutch of the dual clutch of FIG. 1.

As shown in FIG. 4, actuating lever 21 for the drive shaft clutch 2 has a radially inner lever end 39 formed radially inside the pivot axis 22, and is pre-biased by means of a torsion spring 66. The radially outer lever end 40 of the actuating lever 21 is provided with an opening through which the pivot axis 22 extends. The inner lever end 39 is in contact with an adjuster ring 41. The latter is supported relative to a metal locating pin 43 by means of a roller bearing system 42, so that relative rotation between adjuster ring 41 and locating pin 43 is possible, and position changes of the locating pin 43 in the axial direction are transmitted to the adjuster ring 41. Radially inside the pivot axis 22, the actuating lever 21 is provided with a threaded through opening 44 running in the axial direction. An adjusting screw 45 is screwed into the latter, which extends through the actuating lever 21 in the axial direction and is in contact with the drive clutch housing 46. The drive clutch 2 can be adjusted by repositioning the adjusting screw 45 relative to the actuating lever 21. The drive clutch housing 46 has a collar 47 that is located on the side of the disk pack 13 facing away from the actuating lever 21 in the axial direction, and presses the disk pack in the axial direction against the clutch base plate 16 by actuation of the actuating lever 21.

Positioned between the drive clutch housing 46 and the clutch base plate 15 is a diaphragm spring 48. The clutch base plate 15 has through holes running in the axial direction, which are only suggested in the drawings and are penetrated in the axial direction by segments or projections of the contact plate 30. The radially inner side of the diaphragm spring 48 rests against the drive clutch housing 46, with a metal ring 49 inserted in between. The radially outer side of the diaphragm spring 48 is in contact with the segments of the contact plate 30 that extend through the clutch base plate 15. It can also be noted that the contact plate 30 and the drive clutch housing 46 are under tension with one another in the axial direction by means of the diaphragm spring 48.

Figure 5:
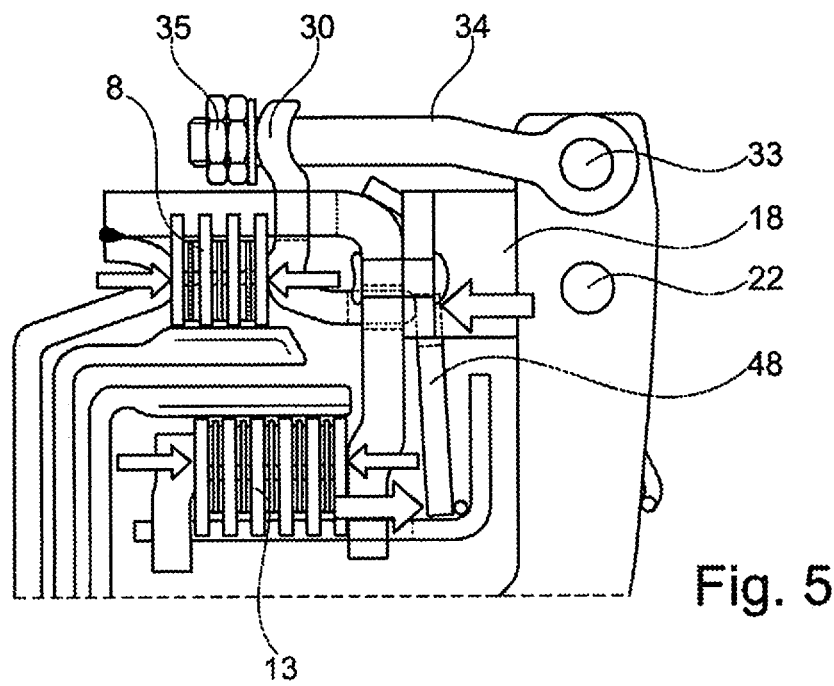
FIG. 5 shows a basic layout diagram of clutch forces in the deactivated state.
Figure 3:
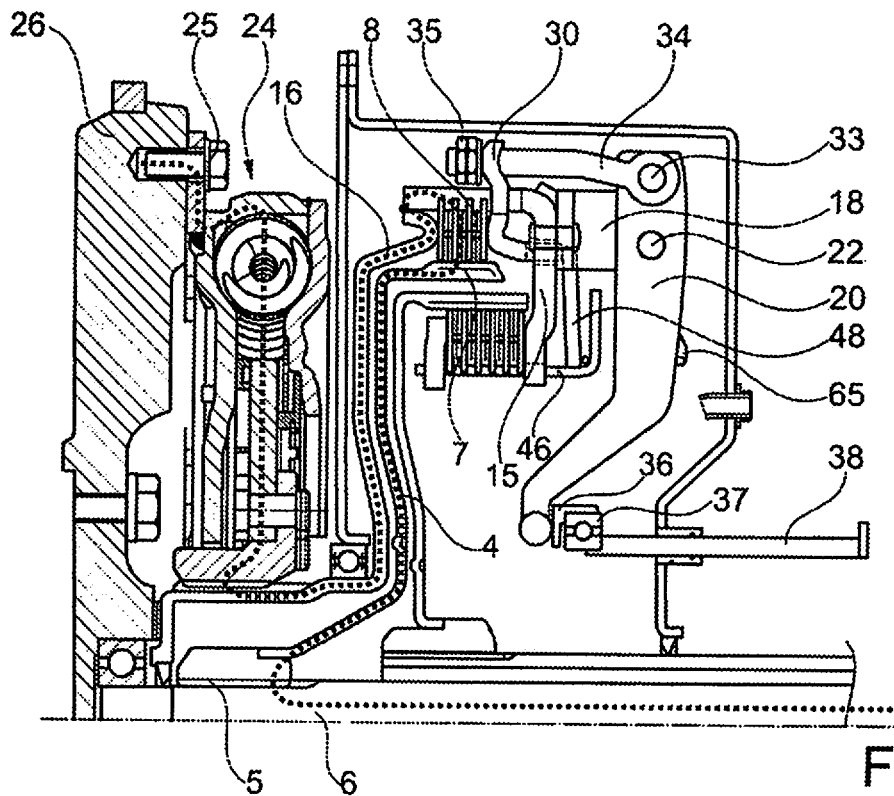
FIG. 3 shows the flow of torque in the power take-off shaft clutch of the dual clutch of FIG. 1.

The drive shaft clutch 2 and the power take-off shaft clutch 3 are actuatable independently of one another. In the non-actuated state, both the power take-off shaft clutch 3 and the drive shaft clutch 2 are engaged (normally closed). The pressure force necessary to engage the clutches 2, 3 and press the disk packs 8, 13 together is produced by the diaphragm spring 48. The non-actuated state is shown in FIG. 5.

Figure 6:
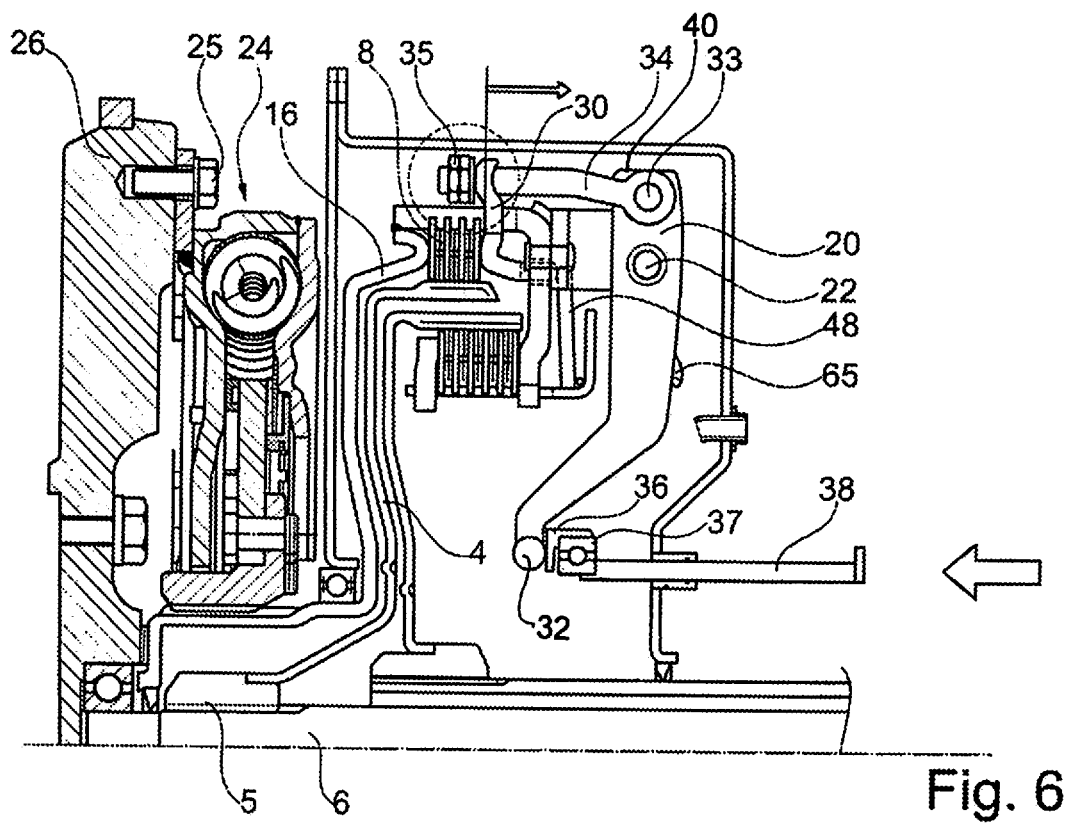
FIG. 6 shows a basic layout diagram of the actuation of the power take-off shaft clutch.

The description of the actuation of the power take-off shaft clutch 3 is provided with reference to FIG. 6. Compared to the non-actuated state, the locating pin 38 is shifted axially in the direction of the flywheel 26. This position change results in a pivoting of the actuating lever 20 about the pivot axis 22 in the clockwise direction. The outer lever end 40 moves in the axial direction away from the flywheel 26, taking the eye bolt 34 with it. The contact plate 30 is moved away from the disk pack 8 toward the diaphragm spring 48, so that the latter is no longer clamped between the contact plate 30 and the base plate carrier 16 and the power take-off shaft clutch 3 disengages.

Figure 7:
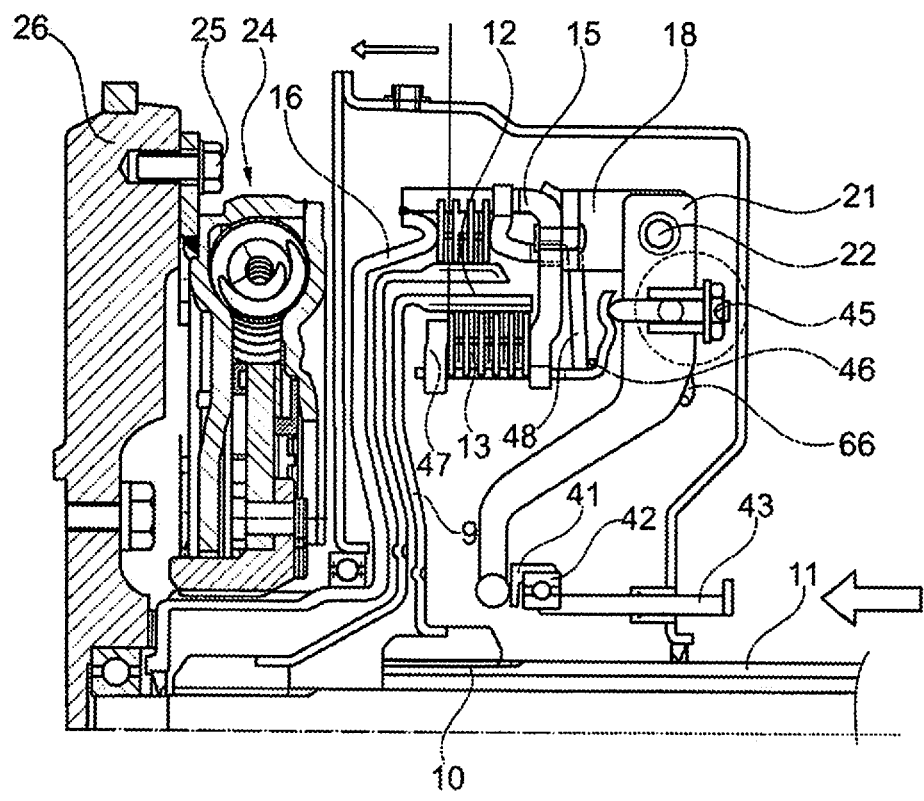
FIG. 7 shows a basic layout diagram of the actuation of the drive shaft clutch.

The description of the actuation of the drive shaft clutch 2 is provided with reference to FIG. 7. Compared to the non-actuated state, the locating pin 43 is shifted axially in the direction of the flywheel 26. This position change results in a pivoting of the actuating lever 21 about the pivot axis 22 in the clockwise direction. The pivoting of the actuating lever 21 causes a shift of the adjusting screw 45 in the direction of the flywheel 26. The drive clutch housing 46 with the collar 47 is moved toward the diaphragm spring 48 in the direction of the flywheel away and from the disk pack 13, so that the latter is no longer clamped between the collar 47 and the clutch base plate 15 and the drive shaft clutch 2 disengages.

Figure 10:
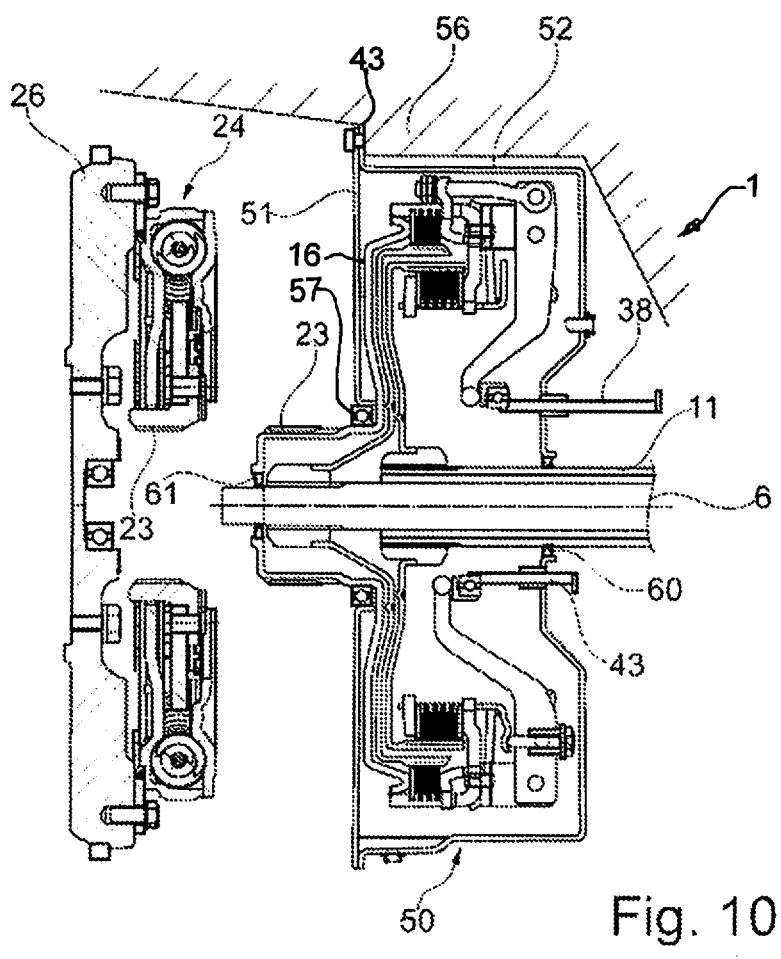
FIG. 10 is a schematic view showing the installation of the dual clutch of FIG. 1 on a vehicle.

As best seen in FIG. 2, dual clutch 1 according to the present invention is designed as a wet clutch, and is therefore sealed against the environment by means of a housing 50. The housing 50 has a first housing part 51, also referred to as the engine-side wet chamber cover, and a second housing part 52, also referred to as the transmission-side wet chamber cover. Covers 51 and 52 are tightly connected to one another by means of a flange 53, with a housing seal 54 interposed. The flange 53 has a passage opening 55 or a plurality of passage openings 55, with which the housing 50 and thus the dual clutch 1 is mounted on a structure of a vehicle as shown in FIG. 10, for example on a transmission housing 56 of a tractor. The base plate carrier 16 is supported opposite the first housing part 51 by means of a roller bearing 57.

FIG. 1 shows that the second housing part 52 has respective feed-throughs 58 for the locating pins 38 and 43. The locating pins 38, 43 are each carried through in the axial direction by a feed-through 58, so that they act on the respective actuating lever 20 or 21 in the interior of the housing 50 through the respective roller bearings 37 or 42, and are actuatable from outside the housing 50 by means of respective throw-out bearings knot shown) that are provided in a known manner, for example for dry dual clutches. The locating pins 38, 43 are sealed in the relevant pass-throughs 58 by means of O-ring seals 59. To further seal off the interior of the dual clutch 1 enclosed by the housing 50, the roller bearing 57 is designed as a sealed bearing. The second housing part 52 is sealed in relation to the drive shaft 11 by means of an oil seal 60. Finally, the base plate carrier 16 is sealed in relation to the power take-off shaft 6 by means of an oil seal 61.

Figure 8A:
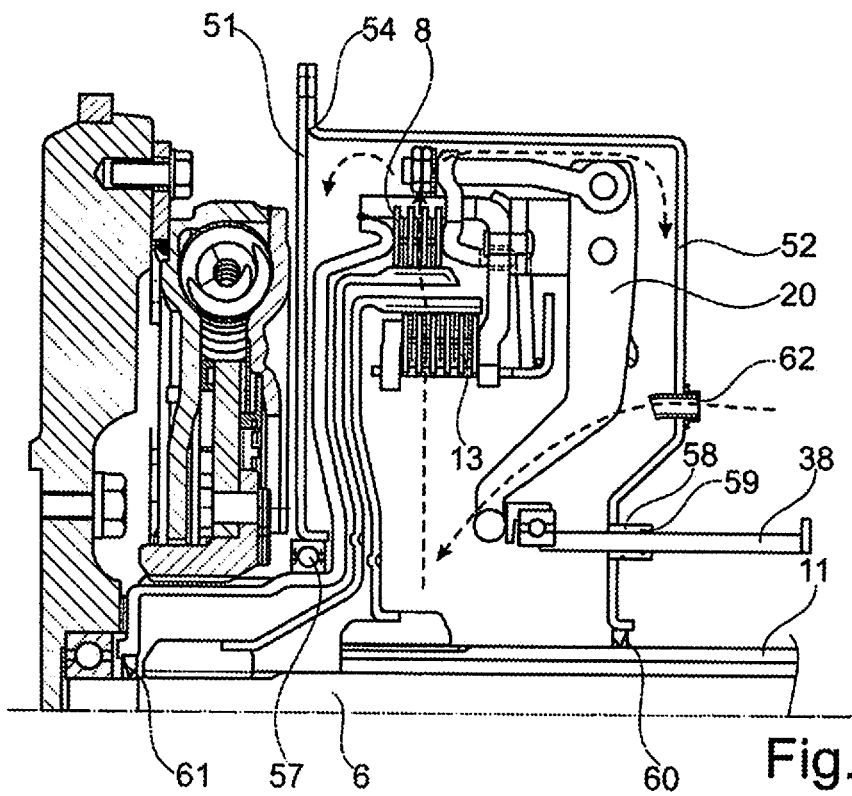
FIGS. 8A and 8B show basic diagrams of the cooling oil flow directions within the clutch.
Figure 8B:
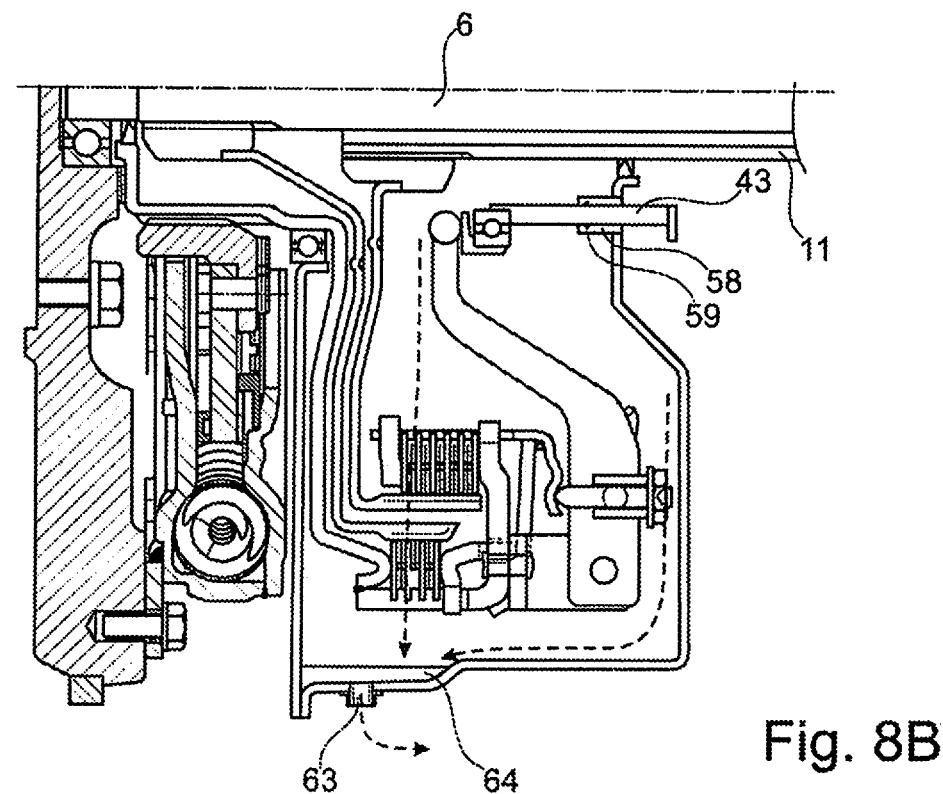

Furthermore, the second housing part 52 has a feed-through for an oil supply line 62 and a feed-through for an oil drain 63 (see, for example, FIGS. 8A, 8B). Cooling oil (at approx. 80° C.) introduced into the housing 50 through the oil supply line 62, for example from the oil sump of the transmission, is distributed in the interior of the housing 50, for example flung radially outward, due to the rotation of the clutch components accommodated in the housing 50, for example the power take-off shaft 6, the drive shaft 11, the disk carriers 4 and 9, and the parts moved thereby. The oil wets the disk packs 8 and 13 that are heating up during operation of the clutch, and cools them down. The oil drain 63 is provided at the radially lowest point of the housing 50, so that oil that collects in a channel 64 and has been heated by operation of the clutch can be removed easily from the housing 50, for example to the oil sump of the transmission. The oil flow through the dual clutch is represented by the dashed lines in FIGS. 8A and 8B.

The principle of installation of the dual clutch 1 on the vehicle is shown in FIG. 10. First, the dual clutch 1 accommodated and installed in the housing 50 is mounted on the transmission housing 56 of the vehicle, by being screwed to the latter by means of the flange 53. As the mounting step is carried out, the outer ends of the locating pins 38, 43, designed in the form of corresponding interfaces are connected to conventional throw-out bearings (not shown) provided on the vehicle. Next, the arc-shaped spring damper unit 24 is joined with the dual clutch 1 by means of the toothed connection 23, designed for example as a splined shaft profile.

What is claimed is:

1. A multi-plate dual clutch for coupling a motor vehicle engine to a drive shaft of a motor vehicle transmission and to an auxiliary output shaft of an auxiliary power take-off of the motor vehicle, said multi-plate dual clutch comprising:
   a drive clutch connected with a drive shaft of a motor vehicle engine for coupling the motor vehicle engine with the drive shaft; and
   an auxiliary power take-off clutch for coupling the motor vehicle engine with the auxiliary output shaft;
   wherein the drive clutch and the auxiliary power take-off clutch are each operable independently of one another by respective separate lever mechanisms;
   wherein the multi-plate dual clutch includes a fluid-tight wet chamber housing within which the drive clutch, the auxiliary power take-off clutch, and the respective separate lever mechanisms are positioned; and
   wherein the fluid-tight wet chamber housing includes a coolant inlet and a coolant outlet that is spaced from the coolant inlet and positioned on a lower wall of the fluid-tight wet chamber housing.

2. A multi-plate dual clutch according to claim 1, wherein the fluid-tight wet chamber housing includes a first housing part and a second housing part that are connected to one another in a fluid-tight relationship.

3. A multi-plate dual clutch according to claim 1, wherein the fluid-tight wet chamber housing includes a flange for attachment of the fluid-tight wet chamber housing to a structural component of the motor vehicle.

4. A multi-plate dual clutch according to claim 1, wherein the fluid-tight wet chamber housing includes a feed-through to receive a positioning element which is arranged for movement in an axial direction of the clutch housing during operation of the clutch by a disengaging system, including a locating pin that is operatively connected to a clutch actuating mechanism and axially slideable through a bearing unit carried in a wall of the fluid-tight wet chamber housing.

5. A multi-plate dual clutch according to claim 1, wherein the fluid-tight wet chamber housing is sealed off from the drive shaft and from the auxiliary output shaft by respective oil seals.

6. A multi-plate dual clutch according to claim 1, wherein the drive clutch includes a drive clutch disk carrier non-rotatably connected to the drive shaft, and the auxiliary power take-off clutch includes an auxiliary power takeoff take-off clutch disk carrier non-rotatably connected to the auxiliary output shaft.

7. A multi-plate dual clutch according to claim 2, wherein the first housing part and the second housing part are formed sheet metal parts.

8. A multi-plate dual clutch for coupling a motor vehicle engine to a drive shaft drive shaft of a motor vehicle transmission and to an auxiliary output shaft of an auxiliary power take-off of the motor vehicle, said multi-plate dual clutch comprising:
 a drive clutch connected with a drive shaft of a motor vehicle engine for coupling the motor vehicle engine with the drive shaft;
 an auxiliary power take-off clutch for coupling the motor vehicle engine with the auxiliary output shaft;
 wherein the drive clutch and the auxiliary power take-off clutch are each operable independently of one another by respective separate lever mechanisms;
 wherein the multi-plate dual clutch includes a fluid-tight wet chamber housing within which the drive clutch, the auxiliary power take-off clutch, and the respective separate lever mechanisms are positioned; and
 wherein the fluid-tight wet chamber housing includes a feed-through to receive a positioning element which is arranged for movement in an axial direction of the clutch housing during operation of the clutch by a disengaging system, including a locating pin that is operatively connected to a clutch actuating mechanism and axially slideable through a bearing unit carried in a wall of the fluid-tight wet chamber housing.

9. A multi-plate dual clutch according to claim 8, wherein the fluid-tight wet chamber housing includes a first housing part and a second housing part that are connected to one another in a fluid-tight relationship.

10. A multi-plate dual clutch according to claim 9, wherein the first housing part and the second housing part are formed sheet metal parts.

11. A multi-plate dual clutch according to claim 8, wherein the fluid-tight wet chamber housing includes a flange for attachment of the fluid-tight wet chamber housing to a structural component of the motor vehicle.

12. A multi-plate dual clutch according to claim 8, wherein the fluid-tight wet chamber housing is sealed off from the drive shaft and from the auxiliary output shaft by respective oil seals.

13. A multi-plate dual clutch according to claim 8, wherein the drive clutch includes a drive clutch disk carrier non-rotatably connected to the drive shaft, and the auxiliary power take-off clutch includes an auxiliary power take-off clutch disk carrier non-rotatably connected to the auxiliary output shaft.

\* \* \* \* \*